US 6,825,311 B2

(12) United States Patent
Balduff et al.

(10) Patent No.: US 6,825,311 B2
(45) Date of Patent: Nov. 30, 2004

(54) METHOD FOR COOLING POST REACTOR POLYETHYLENE TEREPHTHALATE FLAKES

(75) Inventors: Dennis C. Balduff, Whitehouse, OH (US); Henry A. Schworm, Swanton, OH (US)

(73) Assignee: Phoenix Technologies, L.P., Bowling Green, OH (US)

( * ) Notice: Subject to any disclaimer, the term of this patent is extended or adjusted under 35 U.S.C. 154(b) by 85 days.

(21) Appl. No.: 10/213,973

(22) Filed: Aug. 6, 2002

(65) Prior Publication Data

US 2002/0188094 A1 Dec. 12, 2002

Related U.S. Application Data

(63) Continuation of application No. PCT/US01/49507, filed on Dec. 28, 2001.
(60) Provisional application No. 60/259,751, filed on Jan. 4, 2001.

(51) Int. Cl.[7] ............................................... C08G 63/02
(52) U.S. Cl. .................... 528/272; 264/176.1; 264/219; 422/131
(58) Field of Search ................................. 528/271, 272; 422/131; 264/176.1, 219

(56) References Cited

U.S. PATENT DOCUMENTS 5,534,204 A * 7/1996 Aoki et al. ................. 264/102

FOREIGN PATENT DOCUMENTS

| EP | 0389948 A2 | 10/1990 |
| EP | 0661326 A2 | 7/1995 |
| EP | 0764672 A1 | 3/1997 |

* cited by examiner

*Primary Examiner*—Terressa Boykin
(74) *Attorney, Agent, or Firm*—MacMillan, Sobanski & Todd, LLC; Donald R. Fraser

(57) ABSTRACT

A process for cooling post solid-stating reactor PET flakes comprises conveying PET flakes from a solid-stating reactor to a first separator in the presence of air and water at an elevated pressure, separating the steam from the partially cooled PET flakes, and conveying the partially cooled PET flakes from the first separator to a second separator in the presence of air at an elevated pressure.

17 Claims, 1 Drawing Sheet

METHOD FOR COOLING POST REACTOR POLYETHYLENE TEREPHTHALATE FLAKES

CROSS-REFERENCE TO RELATED APPLICATION

This application is a continuation of International Patent Application No. PCT/US01/49507 filed Dec. 28, 2001 which claims the benefit of U.S. Provisional Patent Application Ser. No. 60/259,751 filed Jan. 4, 2001.

BACKGROUND OF THE INVENTION

The present invention relates to an improved method for quickly cooling post solid-stating reaction and post crystallizer standard flakes, small particle flakes, or pellets of recycled or virgin polyethylene tetephthalate (PET), from temperatures typically in the range of 380° F. to 410° F. to temperatures of less than 150° F., without causing significant change in molecular weight or moisture carryover in the cooled PET.

PET, as well as other polymers, co-polymers, and polycondensates, whether virgin, post-industrial, or post-consumer, in the form of small particle flakes (4 mm or less in the major axis), standard flakes (¼" to ½"), or pellets, that have been solid-stated to increase molecular weight, either in vacuum or in an inert atmosphere such as nitrogen gas, remain in a reactive state subject to further condensation polymerization or oxidation degradation and remain at a relatively high temperature (380° F. to 410° F.) at the end of the useful phase of the solid-stating process.

In batch solid-stating reactors, the polymer material must be cooled to a temperature below which further polymerization or oxidation reactions are eliminated. Only after the solid-stated polymer is cooled to a temperature where further reactivity is eliminated can it be safely and effectively transported out of the reaction vessel for further processing or packaging utilizing traditional material handling techniques. The cooling step in the traditional batch solid-stating process is accomplished in situ, under reduced temperatures, but always under vacuum or an inert gas atmosphere. Typically, the cooling period can take as much time as the temperature ramp-up and solid-stating polymerization phase. In order to make more efficient use of the reactor, and increase the productivity, a method for effectively cooling the reacted polymer is desirable.

It would be desirable to develop a process for cooling post reaction PET flakes in a manner that prevents a significant change in molecular weight and prevents chromophore formation.

SUMMARY OF THE INVENTION

A process for cooling post solid-stating reactor PET flakes, in a manner which prevents any significant change in molecular weight, has surprisingly been discovered. The process comprises the steps of:

conveying PET flakes from a solid-stating reactor to a first separator, in the presence of air and water at an elevated pressure, wherein the PET flakes are partially cooled and the water is converted to steam by contact with the PET flakes;

separating the steam from the partially cooled PET flakes; and conveying the partially cooled PET flakes from the first separator to a second separator, in the presence of air at an elevated pressure, wherein the PET flakes are further cooled and dried.

The inventive process is particularly well-suited for cooling PET flakes which have been solid-stated to a particular intrinsic viscosity value which must be retained, for use in subsequent forming operations.

BRIEF DESCRIPTION OF THE DRAWING

The invention will become clearly manifest to those skilled in the art from reading the following detailed description of a preferred embodiment of the invention when considered in the light of the accompanying drawing, in which.

DETAILED DESCRIPTION OF THE PREFERRED EMBODIMENT

Figure 1:
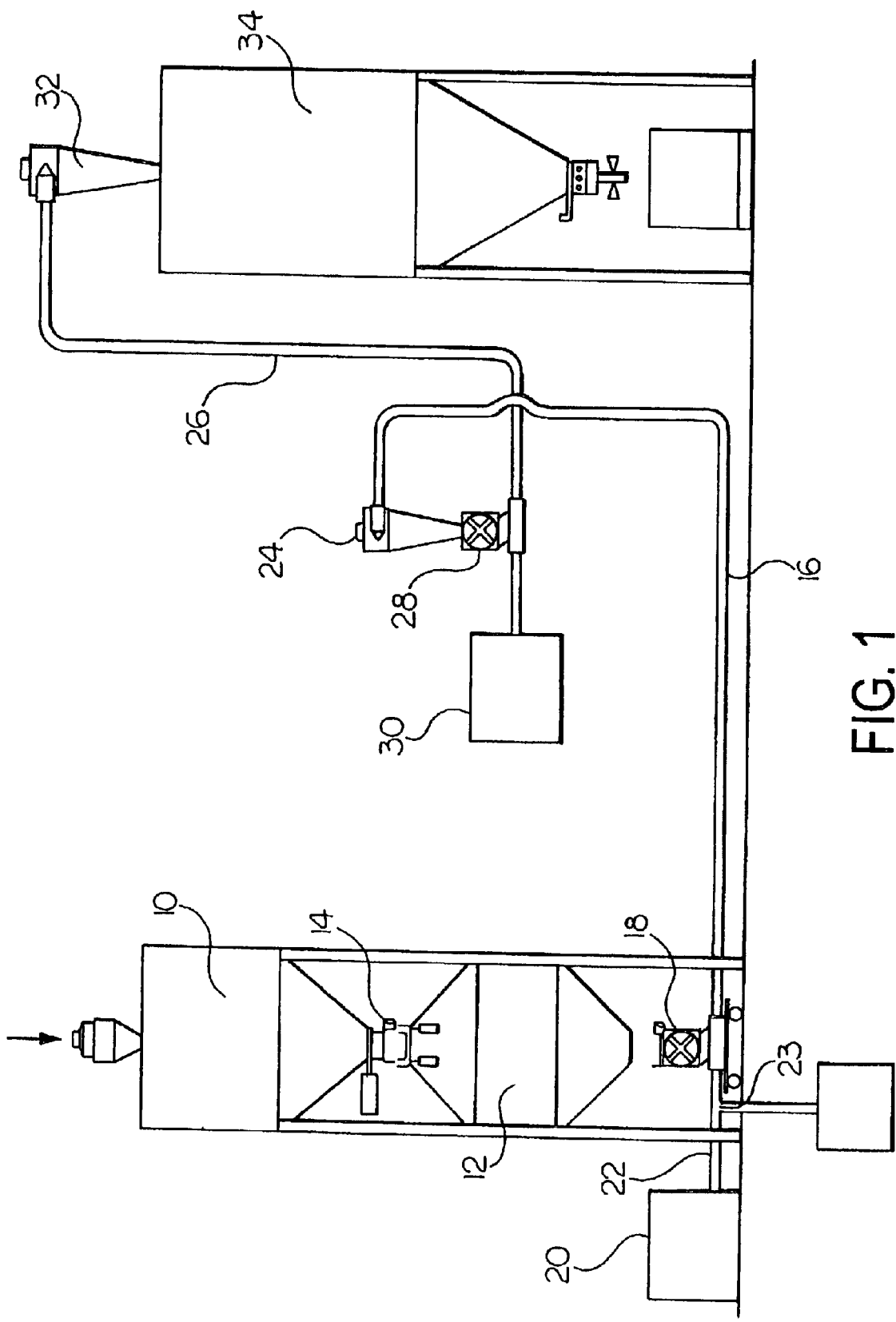
FIG. 1 is a schematic illustration of apparatus useful for practicing a preferred embodiment of the cooling process of the present invention.

Referring to FIG. 1, there is shown a system for cooling PET flakes after the polymeric material has been solid-stated. The system includes a hopper 10 which is designed to store the material to be solid-stated. The outlet of the hopper 10 communicates with the inlet of a solid-stating reactor 12 through a metering valve 14. The metering valve 14 is effective to deliver measured quantities of polymeric material into the reactor 12 from the supply hopper 10.

The outlet of the reactor 12 communicates with a transfer pipe 16 through a rotary air lock 18. A pressure transfer air blower 20 is coupled to the transfer pipe 16 through a short transfer pipe 22 and the rotary air lock 18.

Treated water is introduced into the short transfer pipe 22 as a fine spray at an injection point 23 in the short transfer pipe 22. The fine spray of water is impinged by the turbulent pressurized air introduced into the short transfer pipe 22 from the air blower 20.

The rotary air lock 18 introduces hot solid-stated PET flakes into the fine spray of water and air. The purpose of the rotary air lock 18 is to introduce material from a non-pressurized zone of the reactor 12 to a pressurized zone, and to effectively meter the hot polymeric material at a constant rate. The polymeric material is transferred from the reactor 12 to the transfer pipe 16 at a rate conventionally used to cool flowing particulate materials.

The hot PET flakes introduced into the transfer pipe 16 liberate a portion of the heat energy to the water spray which converts most of the water to steam. Not all of the heat content of the transient polymeric material can be transferred instantaneously to the water however since, at some depth of the particle size, the heat transfer is conduction dependent. The majority of the water spray is converted to steam as the mixture is caused to move through the transit pipe 16. The steam is then separated as the mixture enters a first separator 24, for example, a depressurization deceleration cyclone. The partially cooled PET flakes drop to the bottom of the first separator 24 and are thereafter transferred to an air transfer pipe 26 through a second rotary air lock 28. The air transfer pipe 26 is provided with pressurized air from a pressure air blower 30. The PET flakes are further cooled and dried as they travel through the air transfer pipe 26 to the inlet of a second separator 32, for example, a cyclone separator. As the mixture enters the second separator 32, the residual water vapor and hot air are separated from the cooled, dried PET flakes.

The cooled, dried PET flakes may conveniently be collected in an associated storage bin 34. The stored flakes may later be removed from the storage bin 34 for further processing or packaging.

The inventive process comprises a novel means for cooling solid-stated polymer product quickly (97% reduction in cooling time required) without deleterious effects such as a modification of molecular weight or chromophore formation. The method utilizes the heat of vaporization of water to instantaneously quench the surface of the polymer product, thus halting further diffusion of oxygen or water into the product particle. Moreover, this method provides further cooling by maintaining contact between the PET flakes, the water, and the turbulent air during transfer of the material from the first reactor, so that more water vaporization can take place, thus achieving even lower product temperature. By judiciously controlling the water flow rate to the polymer product exit rate from the reactor, the polymer will be cooled and transferred having low residual moisture. Finally, the PET flakes are transported and dried utilizing a pressurized air stream, to ultimately prepare cooled, dried PET flakes which may thereafter be further processed.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A process for cooling post solid-stating reactor PET flakes, comprising the steps of:
   conveying PET flakes from a solid-stating reactor
   to a first separator, in the presence of air and water at an elevated pressure, whereby the PET flakes are partially cooled and the water is substantially converted to steam by contact with the PET flakes;
   separating the steam from the partially cooled PET flakes; and
   conveying the partially cooled PET flakes from the first separator to a second separator, in the presence of air at an elevated pressure, whereby the PET flakes are further cooled and dried.

2. The process for cooling post solid-stating reactor PET flakes according to claim 1, wherein the PET flakes are conveyed to the first separator in an air stream having a velocity from about 1,800 to about 5,000 feet per minute.

3. The process for cooling post solid-stating reactor PET flakes according to claim 1, wherein the PET flakes are conveyed to the first separator at a pressure from about 15 to about 35 psia.

4. The process for cooling post solid-stating reactor PET flakes according to claim 1, wherein the PET flakes are conveyed to the first separator at a rate from about 25 to about 1,000 pounds per minute.

5. The process for cooling post solid-stating reactor PET flakes according to claim 1, whereby the PET flakes conveyed to the first separator are cooled to a temperature from about 170 to about 215 degrees Fahrenheit.

6. The process for cooling post solid-stating reactor PET flakes according to claim 1, wherein the partially cooled PET flakes are conveyed to the second separator in an air stream having a velocity from about 1,800 to about 5,000 feet per minute.

7. The process for cooling post solid-stating reactor PET flakes according to claim 1, wherein the partially cooled PET flakes are conveyed to the second separator at a pressure from about 15 to about 35 psia.

8. The process for cooling post solid-stating reactor PET flakes according to claim 1, wherein the partially cooled PET flakes conveyed to the second separator are further cooled to a temperature below about 170 degrees Fahrenheit.

9. A process for cooling post solid-stating reactor PET flakes, comprising the steps of:
   conveying PET flakes at a rate from about 25 to about 1,000 pounds per minute from a solid-stating reactor to a first separator, in the presence of air and water at an elevated temperature, said air traveling at a velocity from about 1,800 to about 5,000 feet per minute at a pressure from about 15 to about 35 psia, whereby the PET flakes are partially cooled to a temperature from about 170 to about 215 degrees Fahrenheit and the water is substantially converted to steam by contact with the PET flakes;
   separating the steam from the partially cooled PET flakes; and
   conveying the partially cooled PET flakes from the first separator to a second separator, in the presence of air at an elevated pressure, said air traveling at a velocity from about 1,800 to about 5,000 feet per minute at a pressure from about 15 to about 35 psia, whereby the PET flakes are further cooled and dried.

10. The process for cooling post solid-stating reactor PET flakes according to claim 9, wherein the PET flakes are conveyed to the first separator in an air stream having a velocity from about 2,000 to about 3,500 feet per minute.

11. The process for cooling post solid-stating reactor PET flakes according to claim 9, wherein the PET flakes are conveyed to the first separator at a pressure from about 20 to about 30 psia.

12. The process for cooling post solid-stating reactor PET flakes according to claim 9, wherein the PET flakes are conveyed to the first separator at a rate from about 50 to about 500 pounds per minute.

13. The process for cooling post solid-stating reactor PET flakes according to claim 9, wherein the PET flakes conveyed to the first separator are cooled to a temperature from about 190 to about 215 degrees Fahrenheit.

14. The process for cooling post solid-stating reactor PET flakes according to claim 9, wherein the partially cooled PET flakes are conveyed to the second separator in an air stream having a velocity from about 2,000 to about 3,500 feet per minute.

15. The process for cooling post solid-stating reactor PET flakes according to claim 9, wherein the partially cooled PET flakes are conveyed to the second separator at a pressure from about 20 to about 30 psia.

16. The process for cooling post solid-stating reactor PET flakes according to claim 9, wherein the partially cooled PET flakes conveyed to the second separator are further cooled to a temperature below about 160 degrees Fahrenheit.

17. A process for cooling post solid-stating reactor PET flakes, comprising the steps of:
   conveying PET flakes at a rate from about 50 to about 500 pounds per minute from a solid-stating reactor to a first separator, in the presence of air and water at an elevated temperature, said air traveling at a velocity from about 2,000 to about 3,500 feet per minute at a pressure from about 20 to about 30 psia, whereby the PET flakes are partially cooled to a temperature from about 190 to about 215 degrees Fahrenheit and the water is substantially converted to steam by contact with the PET flakes;
   separating the steam from the partially cooled PET flakes; and
   conveying the partially cooled PET flakes from the first separator to a second separator, in the presence of air at an elevated pressure, said air traveling at a velocity from about 2,000 to about 3,500 feet per minute at a pressure from about 20 to about 30 psia, whereby the PET flakes are further cooled and dried.

* * * * *